June 27, 1933.  M. W. KREJCI  1,915,540
PROCESS OF TREATING ORES AND FURNACE THEREFOR
Filed Oct. 28, 1931  2 Sheets-Sheet 1
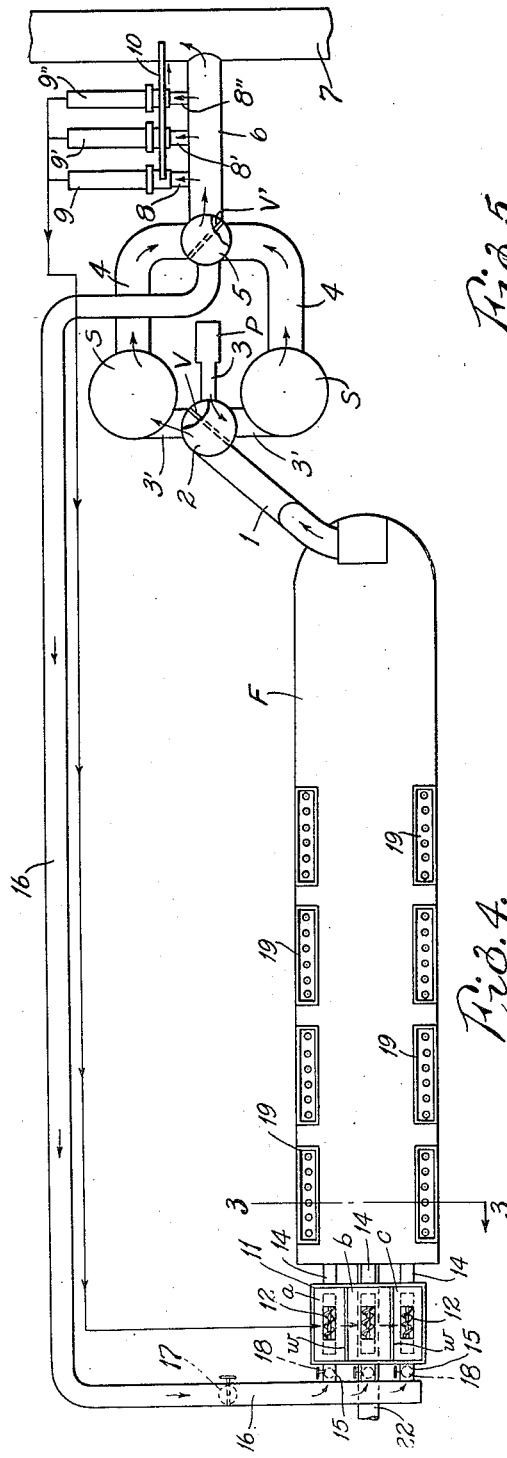
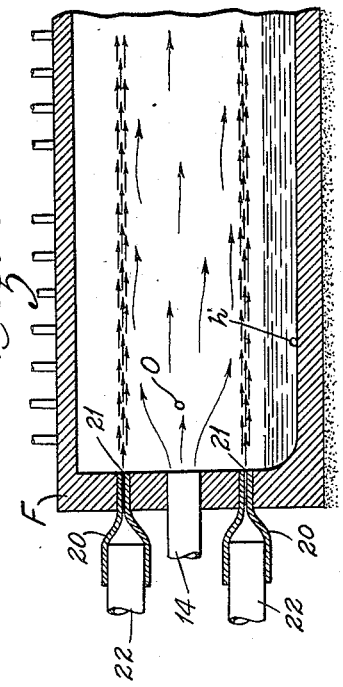
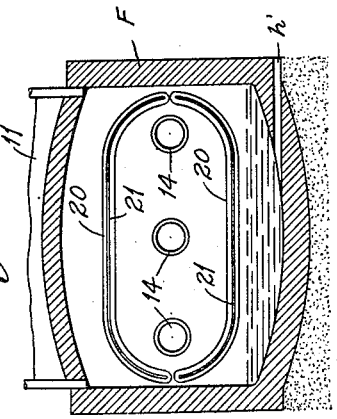
INVENTOR:
MILO W. KREJČI.
By Harry A. Beimes
ATTORNEY.

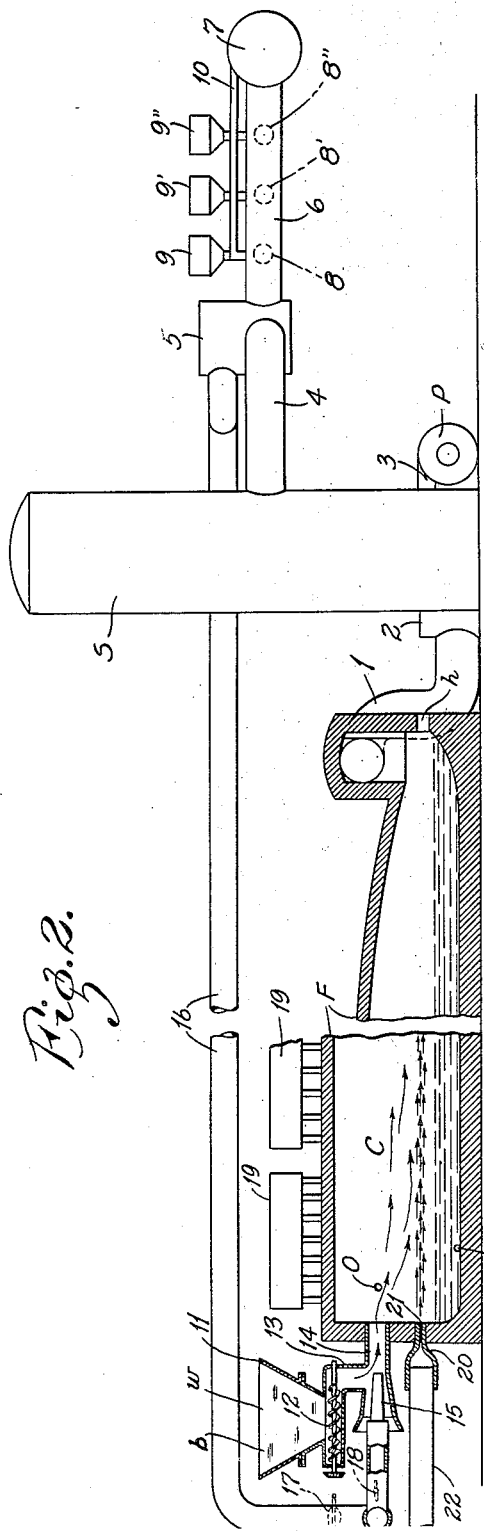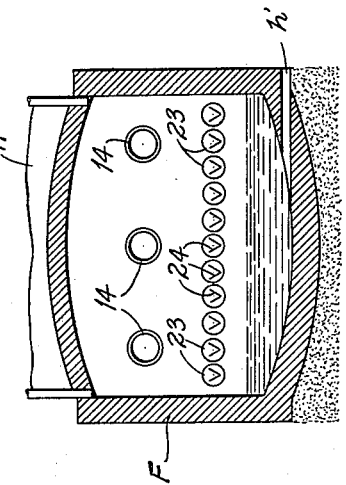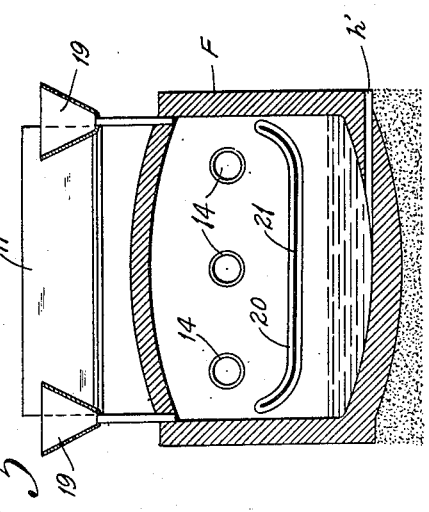

Patented June 27, 1933

1,915,540

UNITED STATES PATENT OFFICE

MILO W. KREJCI, OF NEW YORK, N. Y.

PROCESS OF TREATING ORES AND FURNACE THEREFOR

Application filed October 28, 1931. Serial No. 571,554.

My invention has relation to improvements in processes of smelting ores and metalliferous material generally; and it consists in the novel features more fully set forth in the specification and pointed out in the claims.

The present invention is primarily directed to the smelting of ores and metalliferous material requiring oxidation to generate the heat of fusion, the process being particularly applicable to compounds containing oxidizable constituents serving as fuel, although it may be applied to material to which extraneous fuel may be added if the compound does not naturally contain such constituent in proper proportions to bring about the results here contemplated, and the reduction of ores to their metallic state may also be accomplished. The prevailing combustible constituents availed of under my process are sulfur, iron, arsenic, zinc, and the like, although as above stated, the process is applicable to the treatment of any material in which the element of oxidation inheres, irrespective of the character of the oxidizable constituent present. The process is also applicable to the treatment of metallic oxids by introducing a reducing gas into the furnace as will be more fully explained hereinafter. The chief application of my process is in the smelting of metallic sulfids (particularly those of copper and iron) with a view of forming matte without the preliminary step of roasting, the matte under my process being formed in one operation and in one and the same furnace. By properly regulating the temperature and the degree of oxidation, the smelting operation may be carried to the point where metallic copper is produced, thus eliminating the subsequent step of oxidizing the matte by treatment in a converter, or equivalent metallurgical apparatus. As well understood in the art, the prevailing practice of matte making contemplates a preliminary roasting to expel excess of sulfur where the percentage of this element is too high for matte purposes, preceded by concentration where the ore is low grade, the roasting being followed by treatment in a smelting furnace to produce the matte. The old method requires therefore at least two distinct steps, whereas under my process a single operation (in which these steps are combined) will suffice.

This process is an improvement over those contained in United States Patent No. 1,164,653 dated December 21, 1915, and No. 1,160,621 dated November 16, 1915, and like the processes of said patents is adapted for the treatment of "fines" and dust, whether such "fines" constitute a product of concentration or not. However, in the patents aforesaid there is a tendency for the finely divided ore which is introduced into the furnace chamber in the form of a spray, to settle prematurely on account of their weight, onto the furnace hearth so that there was not sufficient time for the ore particles to undergo treatment while in suspension unless in extremely fine condition. I have discovered that if the suspension of the ore particles under treatment is prolonged beyond that due to their initial velocity, their complete treatment, either oxidation or reduction, will be effected in this state of suspension and these particles will be smelted before entering the bath on the hearth. In other words, the solid ore particles will travel through the combustion chamber of the furnace until the required reaction takes place, and will then fall by gravity into the bath. These ore particles are maintained in suspension by a supporting stratum of air, or other gas either oxidizing, neutral, or reducing (depending upon the metallurgical reaction desired) introduced into the combustion chamber below the point at which the fine ore particles enter. This supporting stratum for the ore particles acts as a conveyer for said particles to carry them through the combustion chamber until they have been treated, and as stated, dropped onto the hearth. By properly controlling the temperature and the degree of oxidation (or reduction, if desired) my improved process may not only be employed for smelting ores, but also for roasting, and converting into their metallic state.

When flotation concentrates are treated in the furnace by my improved process, the operation of drying may also be accomplished if the concentrates are not too wet and sticky, in which instance, the drying, the roasting, the smelting, and the converting to a metal may all be accomplished as a continuous process.

These objects will be better apparent from a detailed description of the invention in connection with the accompanying drawings in which:

Figure 1 is a top plan of a reverberatory furnace and appurtenances showing the method of application of our invention; Fig. 2 is a middle vertical longitudinal section thereof; Fig. 3 is a vertical transverse section on the line 3—3 of Fig. 1; Fig. 4 is a view similar to Fig. 3 showing a modified form of the invention in which the nozzles for introducing the strata of supporting air or other gas, are arranged to project the air into the combustion chamber in the shape of a confining wall for the ore particles; Fig. 5 is a longitudinal section through the feed end of the modified form of furnace shown in Fig. 4; and Fig. 6 shows a further modification of the nozzles for introducing the supporting strata of air.

Referring to the drawings, F represents a reverberatory furnace having an elongated combustion and settling chamber C provided at one end with a slag tap-hold $h$ and at the side with a tap-hole $h'$ at a lower level for the discharge of the molten ore or matte. Leading from one end of the furnace is a waste-gas flue which discharges into a distributer casing 2 provided with a valve or damper V, the casing being connected by a pipe 3 to a suitable blower or air pump P, and by short pipes 3', 3' with the preheating stoves S, S from which lead the conduits 4, 4 which discharge into a second distributer or casing 5 provided with a damper or valve V'. From the casing 5 leads a waste-gas flue 6 discharging into a main 7, a portion of the gases being shunted through shunts or pipes 8, 8', 8'', leading to suitable driers 9, 9', 9'', respectively. The driers are supplied with raw ore, fuel, and flux which when dried is delivered into the hopper 11 mounted at the charging end of the furnace chamber. The hopper 11 in the present instance is shown as divided into three compartments $a$, $b$, $c$ by partition walls $w$, $w$, the compartment $a$ receiving the fuel, $b$ the ore, and $c$ the fluxing material from the driers. At the bottom of each compartment of the charge hopper is a conveyer screw 12 operated from any suitable source of power (not shown) which conducts the material to a down-take 13 discharging into a mixing chamber 14 across the path of discharge of a blast nozzle 15 through which air under pressure is delivered by a hot air flue or conduit 16 leading from the casing 5, the several nozzles 15 leading from the discharge end of said conduit. The latter is provided with a controlling valve 17, each of the nozzles 15 being provided with a valve 18, the discharge ends of the nozzles terminating a trifle short of the inner walls of the downtakes 13 as shown, so that the blast from a nozzle may instantly pick up the material as it drops from the downtake, and project the same through the mixing chamber 14 into the form of a spray or cloud. Any one or more of the nozzles may be set in operation by a proper manipulation of the valve, and any one or more of the conveyer screws 12 may be actuated to deliver the material to the nozzles which are active, the proportions of the materials delivered to the nozzles being regulated by imposing any desired speed of rotation on the conveyers. In this way the exact quantities of ore, fuel, and flux may be projected into the treatment or combustion chamber C to produce the desired product, which in the present case I shall assume is copper matte. Disposed on the sides of the furnace are a series of hoppers 19 for holding raw ore or concentrates, calcines, or flue dust, or any material which when fed into the furnace will neutralize the effect of over oxidation of the material which has settled on the hearth of the furnace.

An air nozzle 20 traverses the wall of the furnace F below the mixing chamber 14, said nozzle extending entirely across the furnace end wall and having a narrow orifice 21 curved slightly upwardly at the ends. The nozzle 20 projects a sheet of air into the combustion chamber under sufficient velocity to provide an air stratum throughout the length of the furnace, if necessary. The air reaches the nozzle 20 through a suitable pipe or conduit 22 and may be either preheated or not as desired. As heretofore stated, if the metallurgical operation requires it, a reducing gas such as hydrogen, or a neutral gas, such as nitrogen may be substituted for air.

In order that the invention may be fully comprehended, I will now describe its operation in connection with the drawings, confining my description by way of example only, to the production of copper matte, assuming that I am treating concentrates high enough in sulfur so as not to require extraneous fuel to keep up the combustion. The furnace is first brought up to the smelting temperature by means of fuel other than the ore and as the furnace heats up, one of the stoves S will become heated by waste gases, after which by the proper manipulation of valves V, V' the air may be forced through the heated stove and the waste gases caused to pass through the first stove and thence through the casing 5 and waste-flue 6 to the main 7 as clearly obvious from the drawings. Once the furnace is brought up to the proper working temperature, the flue 16 will deliver hot air to the nozzle 15 because by that time the stoves S, S are being alternately heated, and the pump P drives the air first through one stove and then through the other. Now, having brought the furnace to the proper working temperature, the conveyers 12 of the compartments *b* and *c* (when flux is necessary) are started and the blast turned into their corresponding nozzles 15, whereupon there is projected into the chamber C a spray or cloud of sulfid ore and fluxing material, the sprayed particles intermingling in the chamber. As the ore particles lose the initial velocity at which they are introduced into the combustion chamber, they settle down and encounter the stratum of rapidly moving air or other gas projected into the combustion chamber by the nozzle 21. This air stratum supports these ore particles and carries them on through the combustion chamber until they have been smelted (if smelting is desired), whereupon they fall of their own weight into the bath on the hearth of the furnace. Thus, this stratum of rapidly moving air or other gas serves as a conveyer to carry the ore particles through the combustion chamber until they have been heated and oxidized to the smelting point. The additional air that is introduced into the combustion chamber by the nozzle 20 makes it possible to carry the operation performed by the furnace beyond the stage of forming matte, and also performing the operation of converting the matte into metallic copper (if copper ores are treated).

If the fuel content (sulfur, iron) of the ore is insufficient to generate the heat and the necessary temperature to bring about fusion of the matte, or product desired, extraneous fuel may be blown into the furnace from the fuel compartment *a*, the same as when the furnace is first started. The use of extraneous fuel is necessary when oxid ores are treated for reduction to metal.

If for any reason over-oxidation of the ore particles resulted in the treatment chamber, this may be neutralized by discharging into and distributing through the fused mass at the bottom of the chamber, a suitable proportion of raw concentrates, calcine or flue dust with which the side hoppers 19 may be charged, the unoxidized or lower oxidized condition of the charges in these hoppers neutralizing the over-oxidation of the fuse mass or bath at the bottom of the treatment chamber.

The process of making matte as described is but a single example of my invention, and I do not wish to be understood as restricting the invention to the production of matte. It may also be employed for the purpose of smelting ores generally in all cases where oxidation enters as one of the necessary steps to bring the charge to the condition at which smelting or fusion is desired, as well as for the treatment of oxid ores, as stated, wherein reducing is one of the necessary steps in the process. In the latter case a reducing gas (such as hydrogen) will be introduced into the combustion chamber from the nozzle 20 instead of air. Thus, it is apparent that the gas stratum maintained in the combustion chamber does not only serve as a conveyer for the ore particles, but also serves to regulate the furnace atmosphere whether oxidizing, reducing, or neutral.

In the modification shown in Fig. 4 I provide an arrangement of nozzles for introducing gaseous strata, both above and below the nozzles which feed the fine ore particles into the combustion chamber. The object of this arrangement is to provide a confining wall of gas around the ore particles so that none of these ore particles will be projected against the furnace roof or walls to cause either erosion or corrosion. The walls thus being protected will require a negligible amount of repair.

I do not wish to be understood as limiting myself to any special construction of furnace or instrumentalities by means of which the process may be carried on. In fact, the apparatus herein illustrated is more or less conventional and diagrammatic, no details being attempted to be shown, the purpose of the drawings being to convey to the skilled metallurgist the generic features of a desirable form of apparatus, from which he can depart at pleasure to meet various conditions, according to the material to be treated, and the environments under which it is treated. In some cases cold air may suffice to produce the blast for the nozzles; a different form of furnace may be used; an oil or fluid hydrocarbon fuel may be substituted; a special design of blower may be necessary; it might be desirable to mix the fuel with the ore and blow the mixture from a single nozzle in lieu of blowing the components independently from separate nozzles as here shown. All such matters are within the purview of the skilled metallurgist and need not be dwelt on to any great length in the present connection.

In the modification shown in Fig. 6 I provide a row of nozzles 23 extending across the entire width of the furnace, each of said nozzles having a V-shaped orifice so that the air stratum that is formed in the combustion chamber will assume a more or less corrugated shape. This will give the air layer somewhat more body and make it more resisting to the penetration of the finely divided material that is sprayed into the combustion chamber.

Having described my invention, I claim:

1. In the treatment of ore, or other material, the process which comprises introducing at high velocity a charge of the material in a finely divided state into a heated treatment chamber, maintaining a horizontal stratum of a gaseous reagent below the point where said charge enters the chamber to serve as a support therefor, and controlling the duration of said support to correspond with the time required to effect the desired reaction.

2. In the treatment of ore or other material, the process which comprises introducing at high velocity a charge of material in a finely divided state into a treatment chamber, maintaining a horizontally moving stratum of a gaseous reagent below the trajectory of said charge, and maintaining the temperature of the reaction at a point to effect fusion of the charge while in suspension.

3. A metallurgical furnace having a treatment chamber, means for heating said chamber, means for blowing finely divided material into said chamber in the form of spray, and gaseous means for supporting and horizontally conveying said sprayed material in the chamber until the desired reaction has been obtained.

4. In the treatment of sulphur bearing ore, or other material, the process which comprises introducing at high velocity a charge of the material in a finely divided state into a treatment chamber, maintaining a horizontally moving stratum of an oxidizing agent below the point of entry of said charge and maintaining the temperature in the treatment chamber at a point to effect oxidation of the sulphur in the charge while the latter is in suspension.

In testimony whereof I hereunto affix my signature.

MILO W. KREJCI.